(12) United States Patent
Harkness

(10) Patent No.: US 9,406,408 B2
(45) Date of Patent: Aug. 2, 2016

(54) PASSIVE SYSTEM FOR COOLING THE CORE OF A NUCLEAR REACTOR

(71) Applicant: Westinghouse Electric Company LLC, Cranberry Township, PA (US)

(72) Inventor: Alexander W. Harkness, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 14/918,665

(22) Filed: Oct. 21, 2015

(65) Prior Publication Data

US 2016/0118147 A1 Apr. 28, 2016

Related U.S. Application Data

(62) Division of application No. 13/744,440, filed on Jan. 18, 2013, now Pat. No. 9,208,906.

(51) Int. Cl.
*G21C 15/18* (2006.01)

(52) U.S. Cl.
CPC ..................... *G21C 15/18* (2013.01)

(58) Field of Classification Search
CPC .................. G21C 15/18; G21D 3/06
USPC ......... 376/260, 264, 268, 271, 272, 282, 283, 376/298, 299
See application file for complete search history.

(56) References Cited

U.S. PATENT DOCUMENTS

| | | | |
|---|---|---|---|
| 4,069,766 A | 1/1978 | Bernstein | |
| 4,405,559 A | 9/1983 | Tokarz | |
| 4,690,795 A | 9/1987 | Hardin, Jr. et al. | |
| 4,950,448 A | 8/1990 | Gou et al. | |
| 5,075,070 A | 12/1991 | Costes | |
| 5,106,571 A | 4/1992 | Wade et al. | |
| 5,268,942 A | 12/1993 | Newton et al. | |
| 5,268,943 A | 12/1993 | Corletti et al. | |
| 5,271,051 A | 12/1993 | Corletti et al. | |
| 5,488,642 A | 1/1996 | Malik et al. | |
| 5,533,074 A | 7/1996 | Mansell | |
| 9,206,978 B2 * | 12/2015 | Evans | G21C 15/16 376/282 |
| 2012/0263268 A1 | 10/2012 | Kwon et al. | |
| 2012/0294407 A1 | 11/2012 | Namba et al. | |
| 2013/0108004 A1 | 5/2013 | Lee et al. | |
| 2013/0294565 A1 | 11/2013 | Harkness et al. | |
| 2013/0336441 A1 | 12/2013 | Cronje et al. | |

FOREIGN PATENT DOCUMENTS

JP 2012-230031 11/2012

OTHER PUBLICATIONS

Westinghouse Electric Company LLC, PCT/US2013/075902 Written Opinion and Search Report, Oct. 1, 2014, 7 pages.

* cited by examiner

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A system for passively cooling nuclear fuel in a pressurized water reactor during refueling that employs gravity and alignment of valves using battery reserves or fail in a safe position configurations to maintain the water above the reactor core during reactor disassembly and refueling. A large reserve of water is maintained above the elevation of and in fluid communication with the spent fuel pool and is used to remove decay heat from the reactor core after the reaction within the core has been successfully stopped. Decay heat is removed by boiling this large reserve of water, which will enable the plant to maintain a safe shutdown condition without outside support for many days.

6 Claims, 13 Drawing Sheets

PASSIVE SYSTEM FOR COOLING THE CORE OF A NUCLEAR REACTOR

CROSS REFERENCE TO RELATED APPLICATIONS

This application is a divisional application of U.S. patent application Ser. No. 13/744,440, filed Jan. 18, 2013, entitled "Passive System for Cooling the Core of a Nuclear Reactor, which application is related to U.S. patent application Ser. No. 13/495,083, filed Jun. 13, 2012, entitled "Small Modular Reactor Safety Systems."

BACKGROUND

1. Field

This invention pertains generally to nuclear reactor safety systems, and more particularly, to a system for passively cooling the core of a nuclear reactor and a spent fuel pool during a refueling outage in the event of a nuclear station blackout.

2. Description of Related Art

A pressurized water reactor has a large number of elongated fuel assemblies mounted within an upright reactor vessel. Pressurized coolant is circulated through the fuel assemblies to absorb heat generated by nuclear reactions in fissionable material contained in the fuel assemblies. The primary side of such a nuclear reactor power generating system which is cooled with water under pressure comprises a closed circuit which is isolated from and in heat exchange relationship with a secondary circuit for the production of useful energy. The primary side comprises the reactor vessel enclosing a core internal structure that supports the plurality of fuel assemblies containing the fissile material, the primary circuit within heat exchange steam generators, the inner volume of a pressurizer, pumps and pipes for circulating pressurized water; the pipes connecting each of the steam generators and pumps to the reactor vessel independently. In conventional nuclear plants of that type each of the parts of the primary side comprising the steam generator, a pump and a system of pipes which are connected to the reactor vessel form a loop of the primary side.

For the purpose of illustration, FIG. 1 shows a simplified conventional nuclear reactor primary system, including a generally cylindrical pressure vessel 10 having a closure head 12 enclosing a nuclear core 14. A liquid coolant, such as water or borated water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

An exemplary conventional reactor design is shown in more detail in FIG. 2. In addition to the core 14 comprised of a plurality of parallel, vertically co-extending fuel assemblies 22, for the purpose of this description, the vessel internal structures can be divided into the lower internals 24 and the upper internals 26. In conventional designs, the lower internals function to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel through one or more inlet nozzles 30, flows down through an annulus between the reactor vessel and the core barrel 32, is turned 180° in a lower plenum 34, passes upwardly through a lower support plate 37 and a lower core plate 36 upon which the fuel assemblies are seated and through and about the fuel assemblies 22. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40 primarily by a plurality of support columns 48. Each support column is aligned above a selected fuel assembly 22 and perforations 42 in the upper core plate 40.

Rectilinearly moveable control rods 28 which typically include a drive shaft or drive rod 50 and a spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

To control the fission process, a number of control rods 28 are reciprocally moveable in guide thimbles at predetermined positions in the fuel assemblies 22. Specifically, a control rod mechanism positioned above the top nozzle of the fuel assemblies supports a plurality of control rods. The control rod mechanism (also known as a rod cluster control assembly) has an internally threaded cylindrical hub member with a plurality of radially extending flukes or arms that form the spider 52 previously noted with regard to FIG. 2. Each arm is interconnected to a control rod 28 such that the control rod assembly mechanism 72 is operable to move the control rods 28 vertically within the guide thimbles within the fuel assemblies to thereby control the fission process in the fuel assembly 22, under the motive power of the control rod drive shaft 50 which is coupled to the control rod mechanism hub, all in a well-known manner.

The upper internals 26 also have a number of in-core instrumentation that extend through axial passages within the support columns 48 and into instrumentation thimbles generally, centrally located within the fuel assemblies. The in-core instrumentation typically includes a thermocouple for measuring the coolant core exit temperature and axially disposed neutron detectors for monitoring the axial and radial profile of the neutron activity within the core.

Nuclear power plants, which employ light water reactors require periodic outages for refueling of the reactor. New fuel assemblies are delivered to the plant and temporarily stored in a fuel storage building in a spent fuel pool, along with used fuel assemblies which may have been previously removed from the reactor. During a refueling outage, a portion of the fuel assemblies in the reactor are removed from the reactor to the fuel storage building. A second portion of the fuel assemblies are moved from one support location in the reactor to another support location in the reactor. New fuel assemblies are moved from the fuel storage building into the reactor to replace those fuel assemblies which were removed. These movements are done in accordance with a detailed sequence plan so that each fuel assembly is placed in a specific location in accordance with an overall refueling plan prepared by the reactor core designer. In conventional reactors, the removal of the reactor internal components necessary to access the fuel and the movement of the new and old fuel between the reactor and the spent fuel pool in the fuel storage building is performed under water to shield the plant maintenance personnel. This is accomplished by raising the water level in the refueling cavity and canal that is integral to the plant building structure. The water level of more than 20 feet provides shielding for the movement of the reactor internal structures and the fuel assemblies. A typical pressurized water reactor needs to be refueled every 18 to 24 months.

Commercial power plants employing the conventional designs generally illustrated in FIGS. 1 and 2 are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact, high pressure containment. Due to both limited space within the containment and the lower cost requirement for integral pressurized light water reactors, the overall number of auxiliary systems including those associated with refueling needs to be minimized without compromising safety or functionality. For that reason, it is desirable to maintain most of the components in fluid communication with the primary loop of the reactor system within the compact, high pressure containment. Typical conventional pressurized water reactor designs make use of active safety systems that rely on emergency AC power after an accident to power pumps required to cool down the reactor and spent fuel pool. Advanced designs, like the AP1000®, offered by Westinghouse Electric Company LLC, Cranberry Township, Pa., make use of passive safety systems that only rely on natural circulation, boiling and condensation to remove the decay heat from the core and spent fuel pool. It is desirable to apply these passive safety system principals to a small modular reactor design and, preferably, simplify the design while still maintaining the safety margins of active systems as was provided for in U.S. application Ser. No. 13/495,083, filed Jun. 13, 2012, entitled "Small Modular Reactor Safety Systems." In many of these Generation III+ pressurized water reactors and small modular reactors which feature passive cooling systems that remove decay heat from the reactor core during a postulated accident, the systems need to be taken out of service before the reactor can be refueled. For a reactor design to be truly passive, it must be able to passively cool fuel in the reactor and spent fuel pool during all modes of refueling.

Accordingly, it is an object of this invention to provide a means for removing decay heat from the reactor core during a postulated accident that will function during all modes of reactor operation including, continuously, during a refueling outage.

It is a further object of this invention to provide such a passive safety system that will function during a station blackout for an extended period of time.

SUMMARY

These and other objects are achieved by a nuclear power generating facility having a containment building and an elongated reactor vessel housed within the containment building. The reactor vessel has a nuclear core having fissile material in which fission reactions take place and an open end axially spaced from the nuclear core, with the open end sealed by a head at a flange. A spent fuel pool is supported outside the containment at an elevation that extends substantially above the reactor vessel, with the spent fuel pool being in fluid communication with an interior of the reactor vessel through a first valve. The nuclear power generating facility further includes an ultimate heat sink coolant reservoir whose upper coolant level under normal operation of a nuclear power generating facility is supported at an elevation substantially above the spent fuel pool. A lower portion of the ultimate heat sink reservoir is in fluid communication with the spent fuel pool through a second valve whose operation is controlled by the level of coolant in the spent fuel pool to maintain the coolant in the spent fuel pool at approximately a preselected level. Preferably, the first valve is either passively operated and/or designed to fail in an open position. Similarly, it is desirable that the second valve is either passively or manually operated and in one embodiment, the second valve is a float valve.

In accordance herewith, the nuclear power generating facility may also include a passive safety system supported within the containment building approximately at or above a first elevation of the flange and structured to maintain a given level of coolant within the reactor vessel for a first selected period of time, when the coolant level in the reactor vessel unintentionally drops. However, the passive safety system is structured to be out of operation during a refueling of the nuclear core.

The nuclear power generating facility may also include a refueling canal establishing a fluid communication path between an inside of the containment building at an elevation above the reactor vessel flange and the spent fuel pool, through which a fuel assembly can pass. Means are also provided for isolating the fluid communication path from the inside of the containment. A refueling cavity may also be supported above the reactor vessel flange and the reactor vessel may be fitted with a branch coolant line. Preferably a gauge is provided on the branch coolant line that has an output indicative of the coolant level above the core to control the first valve to adjust the coolant level to a preprogrammed level. In one embodiment, the gauge is a pressure gauge.

The invention also contemplates a method of passively, safely maintaining the coolant level of the nuclear power generating facility described heretofore, above the nuclear core for an extended period of time during a facility outage in which the reactor vessel is substantially depressurized. The method includes the step of sensing a level of coolant above the nuclear core. The method then controls the first valve to drain coolant from the spent fuel pool into the reactor vessel to maintain the coolant within the reactor vessel at a preprogrammed level above the nuclear core. The method also controls the second valve to drain coolant from the ultimate heat sink coolant reservoir into the spent fuel pool to maintain the coolant in the spent fuel pool at approximately the preselected level. In the foregoing embodiment, in which the nuclear power generating facility has a station blackout, the method includes the steps of opening the first and second valves and flooding at least a portion of the containment vessel. This embodiment also may include a branch coolant line connected to the reactor vessel and a gauge on the branch coolant line having an output indicative of a coolant level above the nuclear core, including the steps of controlling the first valve in response to the output indicative of the coolant level above the core to maintain the coolant at the preprogrammed level.

Desirably, the preprogrammed level is approximately at the reactor vessel flange. In this embodiment wherein the nuclear power generating facility includes a refueling cavity supported above the reactor vessel flange. After the reactor vessel head has been removed, the gauge control is no longer needed to the level of coolant above the nuclear core within the refueling cavity. The first valve is opened and water drains from the spent fuel pool to the refueling tank until the water levels match. Furthermore, in this embodiment wherein the nuclear power generating facility includes a refueling canal, establishing a fluid communication path between an inside of the refueling cavity at an elevation above the reactor vessel flange, and the spent fuel pool, through which a fuel assembly can pass, and means for isolating the fluid communication path from the inside of the refueling cavity, the method further includes the steps of opening the means for isolating the fluid communication path and controlling a level of the coolant within the refueling cavity through the fluid communication path. In such event, under circumstances where the facility has a station blackout, the method further includes the steps of opening the first valve by virtue of its fail safe position ensuring that a required water level above the core is maintained. In the short refueling window in which the reactor has been disassembled but the refueling tank has yet to be installed, this action results in flooding the containment vessel. Water level is maintained by the passive action of the second valve which maintains the spent fuel pool level.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
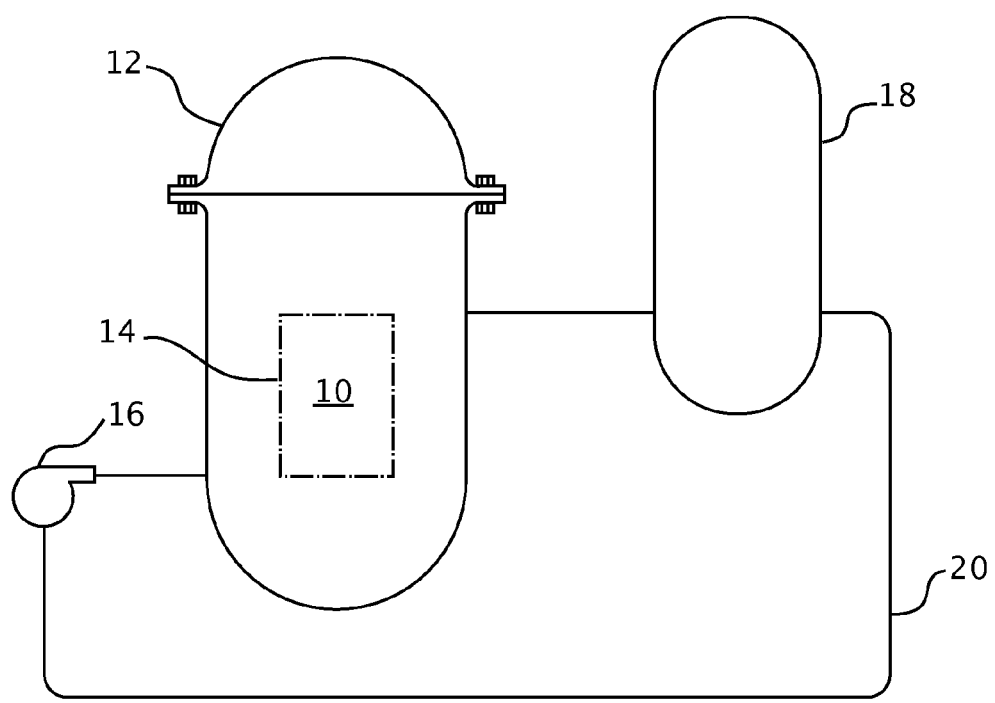
FIG. 1 is a simplified schematic of a conventional nuclear reactor system to which the embodiments described hereafter can be applied.
Figure 2:
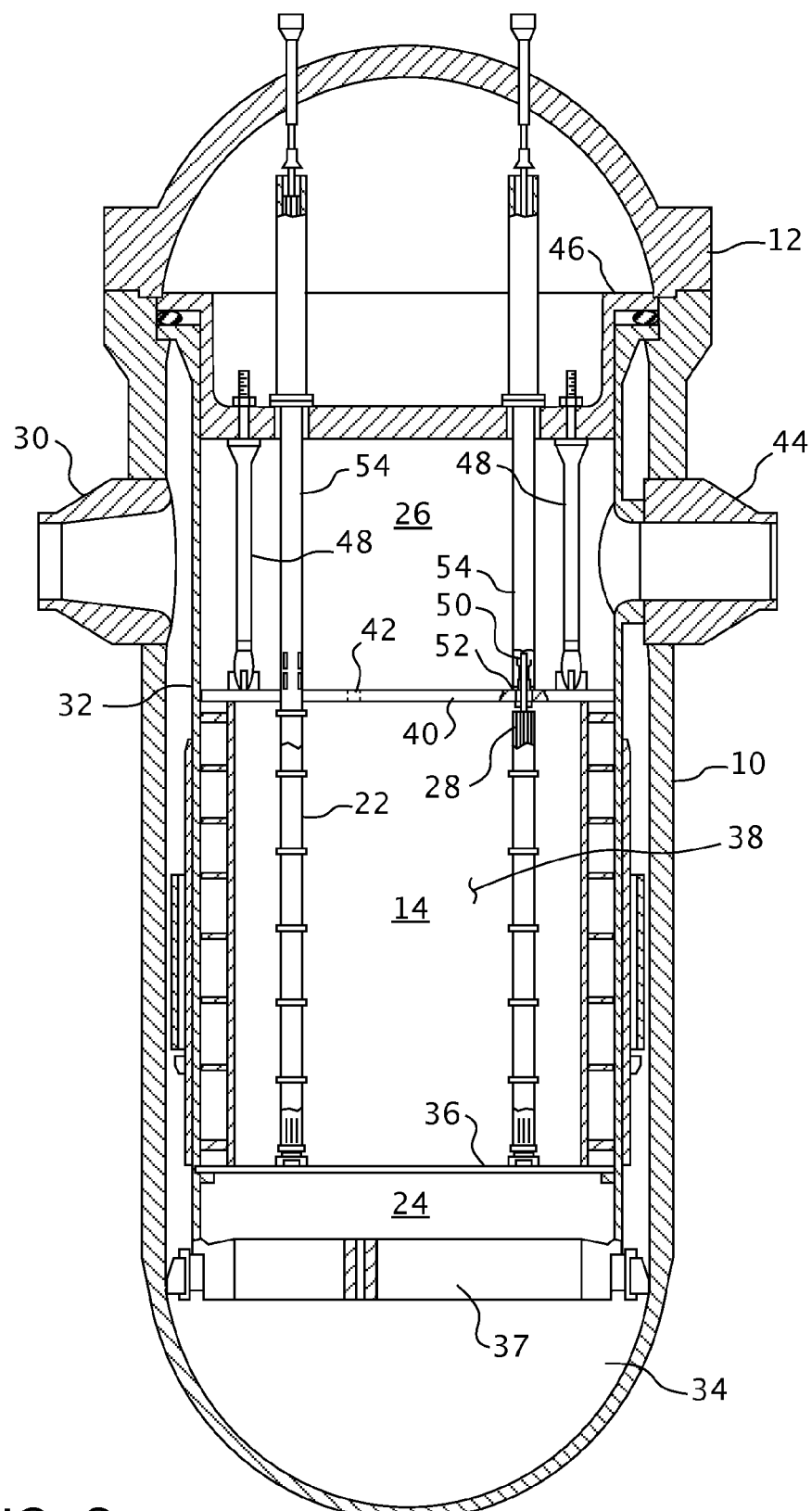
FIG. 2 is an elevational view, partially in section, of a nuclear reactor vessel and internal components to which the embodiments described hereafter can be applied.
Figure 3:
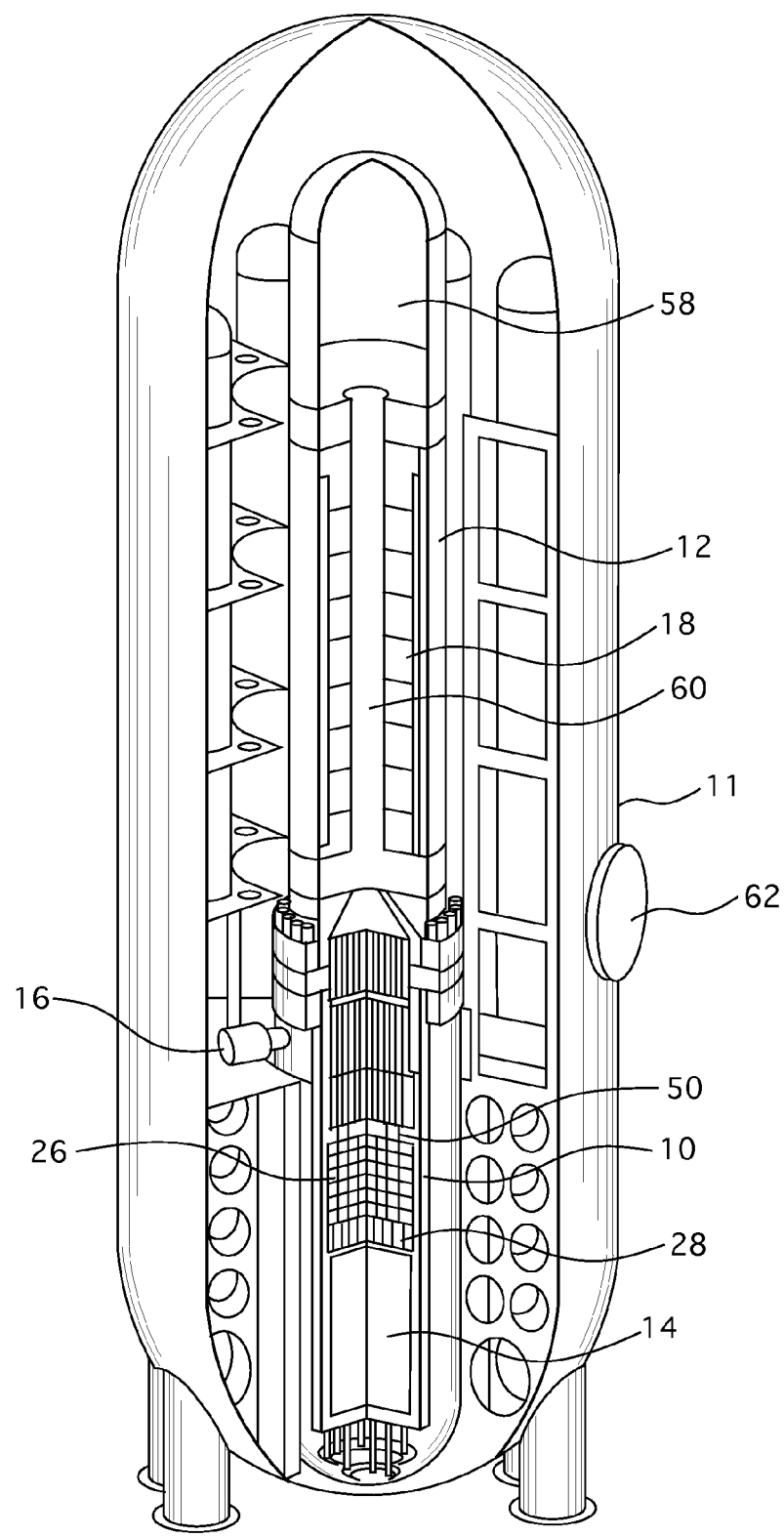
FIG. 3 is a perspective view, partially cut away, showing a small modular integral reactor system to which the invention claimed hereafter can be applied.
Figure 4:
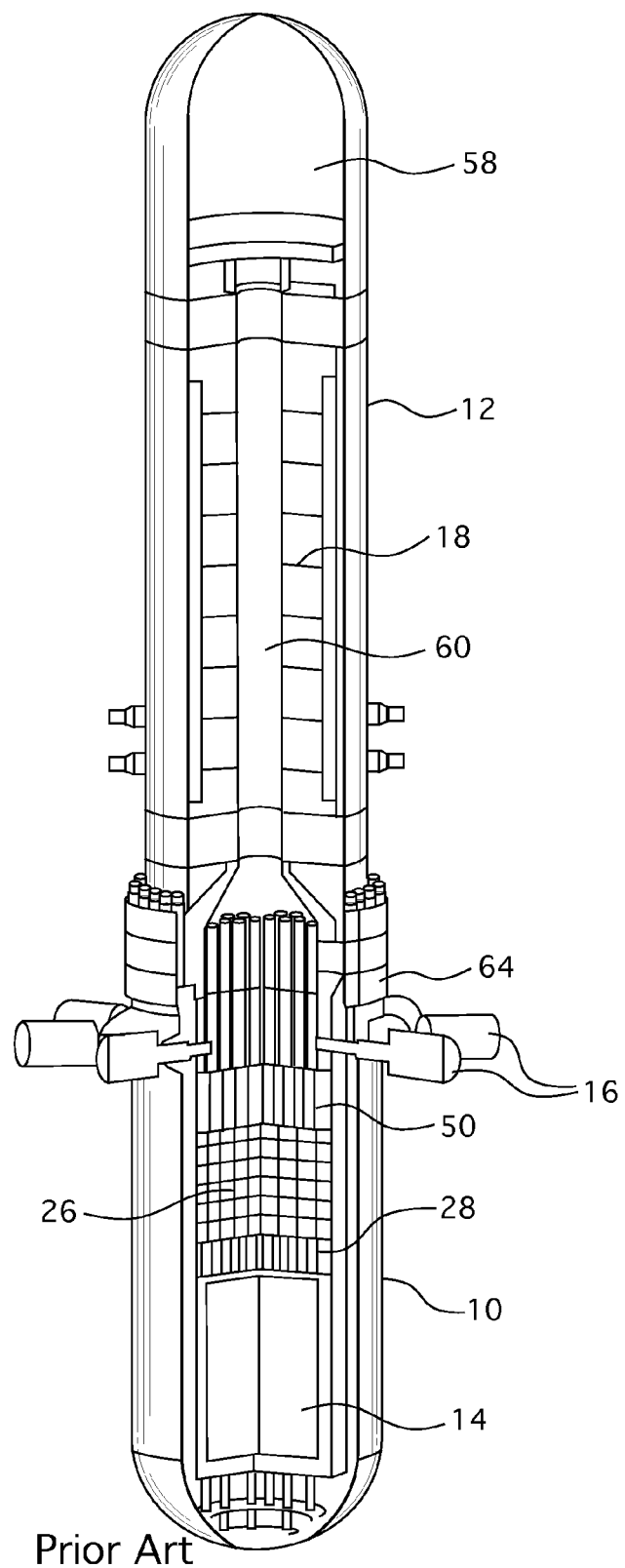
FIG. 4 is an enlarged view of the reactor shown in FIG. 3.

FIGS. 3 and 4 illustrate a small modular reactor design available from Westinghouse Electric Company LLC, Cranberry Township, Pa., to which this invention may be applied, though it should be appreciated that the invention can also be applied to a conventional pressurized water reactor such as the one illustrated in FIGS. 1 and 2. FIG. 3 shows a perspective view of the reactor containment 11, partially cut away, to show the pressure vessel 10 and its internal components. FIG. 4 is an enlarged view of the pressure vessel shown in FIG. 3. The pressurizer 58 is common to most pressurized water reactor designs, though not shown in FIG. 1, and is typically included in one loop to maintain the systems' pressure. In the small modular reactor design illustrated in FIGS. 3 and 4, the pressurizer 58 is integrated into the upper portion of the reactor vessel head 12 and eliminates the need for a separate component. It should be appreciated that the same reference characters are employed for corresponding components among the several figures. A hot leg riser 60 directs primary coolant from the core 14 to a steam generator 18 which surrounds the hot leg riser 60. A number of coolant pumps 16 are circumferentially spaced around the reactor vessel 10 at an elevation near the upper end of the upper internals 26. The reactor coolant pumps 16 are horizontally mounted axial flow canned motor pumps. The reactor core 14 and the upper internals 26, except for their size, are substantially the same as the corresponding components previously described with regard to FIGS. 1 and 2. A further understanding of the operation of the small modular reactor illustrated in FIGS. 3 and 4 can be found in U.S. patent application Ser. No. 13/495,050, filed Jun. 13, 2012, entitled "Pressurized Water Reactor Compact Steam Generator."

Generation III+ pressurized water reactors such as the AP1000® nuclear plant design and small modular reactors like the one just described often feature passive cooling systems that remove decay heat from the reactor core during a postulated accident. In many plant designs, these systems need to be taken out of service before the reactor can be refueled, which is typically every 18 to 24 months. This invention provides a means to passively cool nuclear fuel in a pressurized water reactor during refueling. This invention employs gravity and a series of valves, that can be aligned using battery reserves or fail in a safe position, to maintain water above the reactor core during reactor disassembly and refueling. The embodiment described hereafter applies these principles to a small modular reactor with passive safety systems similar to those disclosed above, however, this principle can be applied to any pressurized water reactor with a compatible plant layout.

In the case of the small modular reactor, the embodiment disclosed herein maintains a large reserve of water 90 within or outside the reactor building, which is used to remove decay heat from the reactor core 14 after the reaction has been successfully stopped. Decay heat, typically about one percent of reactor power, is removed by boiling this large reserve of water, known as the ultimate heat sink. The ultimate heat sink 90 is preferably supported, or at least has an outlet that is above the elevation of the spent fuel pool 80 so that water can drain from the ultimate heat sink 90 into the spent fuel pool 80 by gravity as shown in FIGS. 5 through 13. Similarly, the spent fuel pool 80 is maintained at an elevation that is preferably above the core 14 with an outlet conduit 74 well above the core 14 so that coolant in the spent fuel pool can drain into the reactor vessel 10 through inlet 98 by gravity. The outlet 100 from the spent fuel pool through the conduit 74 to the reactor vessel is preferably high enough so that the spent fuel 82 within the pool does not become uncovered and the pool maintains an adequate depth to satisfactorily cool the spent fuel in the pool. The large volume of water in the ultimate heat sink 90 can allow the plant to maintain a safe shutdown condition without outside support for many days. The number of days is determined by the size of the pool in the ultimate heat sink 90. If decay heat is not removed effectively from the reactor core 14 or the spent fuel 82, the fuel cladding material could exceed its design temperature resulting in loss of integrity and failure of a fuel. This condition is commonly known as a meltdown.

Plant safety systems figuratively represented by reference character 66 in FIGS. 5 through 13 are designed to deal with all postulated accidents. These systems shut down the nuclear reaction and begin removing decay heat from the reactor core 14 when an adverse operating event is detected. Nuclear power plants are designed to spend the vast majority of their time producing steam to ultimately make electricity. This condition is commonly referred to as normal operation. Every 18-24 months, the plant will shut down normally to replenish its fuel. During refueling, the water level in the reactor coolant system is lowered so that the reactor can be disassembled, allowing access to the fuel assemblies in the core. The water in the reactor coolant system is an integral part of the safety system that is designed to remove decay heat. During refueling, safety systems designed to remove decay heat may be taken out of service because of the reduced water level. This invention describes how the water level in the plant can be maintained at the appropriate level for the various stages of refueling using the spent fuel pool 80. It takes a significant amount of heat to change the phase of water; therefore, heat continues to be removed from the core by boiling this water. This is different from existing traditional pressurized water reactor designs that use dedicated storage tanks to manage reactor coolant system inventory as explained in application Ser. No. 13/495,083, filed Jun. 13, 2012 (RTU 2011-011).

In accordance with this invention, the spent fuel pool level 84 is maintained passively from the ultimate heat sink 90, preferably using a passively operated valve 88. The valve 88 may be a float valve, other passively operated valve, or a fail in a safe position valve which opens the conduit 86 from the ultimate heat sink 90 into the spent fuel pool 80 when the pool level 84 is reduced below a preset limit, as illustrated in the embodiments shown in FIGS. 5-13.

The following sections describe the arrangement and the function of one or more embodiments of the system claimed hereafter, throughout the refueling process as illustrated in FIGS. 5-13. FIGS. 5-9 illustrate a normal refueling sequence.

FIGS. 10-13 show how the water levels are passively maintained during postulated accidents, including a station blackout.

Figure 5:
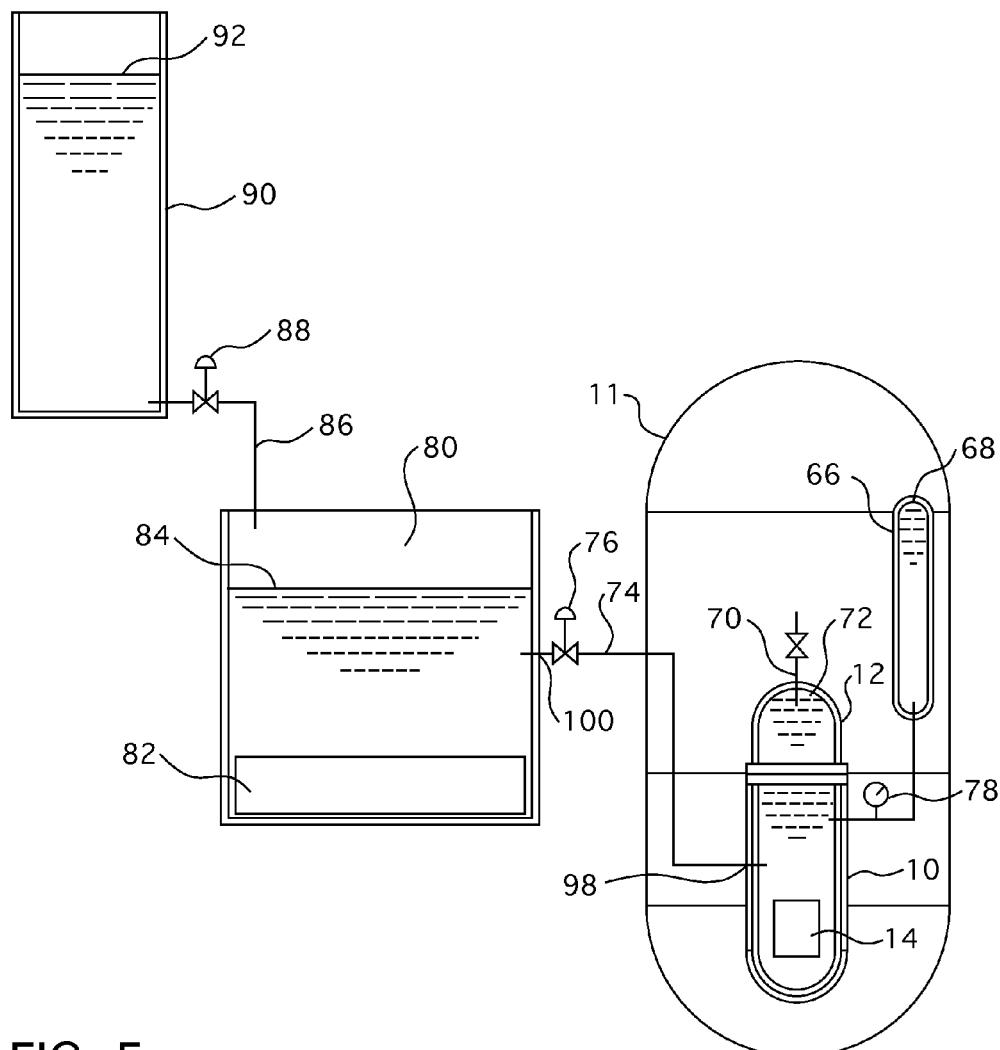
FIG. 5 is a schematic view of a nuclear power plant incorporating one embodiment of the invention claimed hereafter, showing the water level in a number of the component parts of the system under normal operation.

FIG. 5 shows the plant in normal operation. The water in the ultimate heat sink 90 and in the spent fuel pool 80 is maintained at the required levels. The reactor coolant system within the vessel 10 and the safety system components are also at the full levels 72 and 68.

Figure 6:
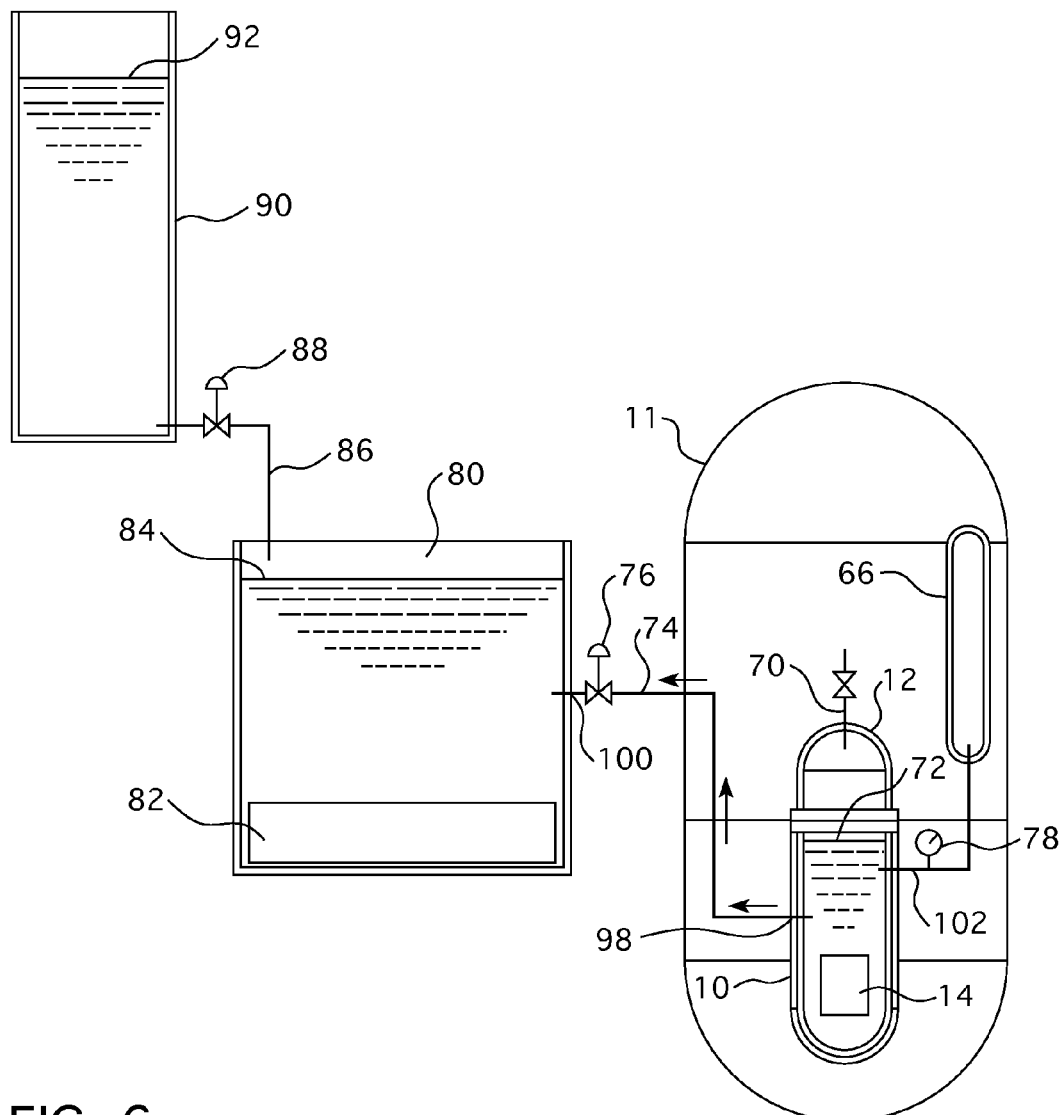
FIG. 6 is the schematic view of the nuclear power plant shown in FIG. 5 in which the water level in the reactor coolant system has been reduced by moving water from the reactor coolant system to the spent fuel pool.

In FIG. 6, the water level 72 in the reactor coolant system has been reduced by moving water from the reactor coolant system to the spent fuel pool 80 through conduit 74 and valve 76. This raises the spent fuel pool water level 84. Since the spent fuel pool volume is very large compared to the reactor coolant system, the level 84 is raised only a few inches. A reactor coolant system vent 70 is opened to allow the level 72 in the vessel 10 to drop. A pressure gauge 78 on one of the reactor branch lines 102 is used to measure the level 72 in the reactor coolant system.

Figure 7:
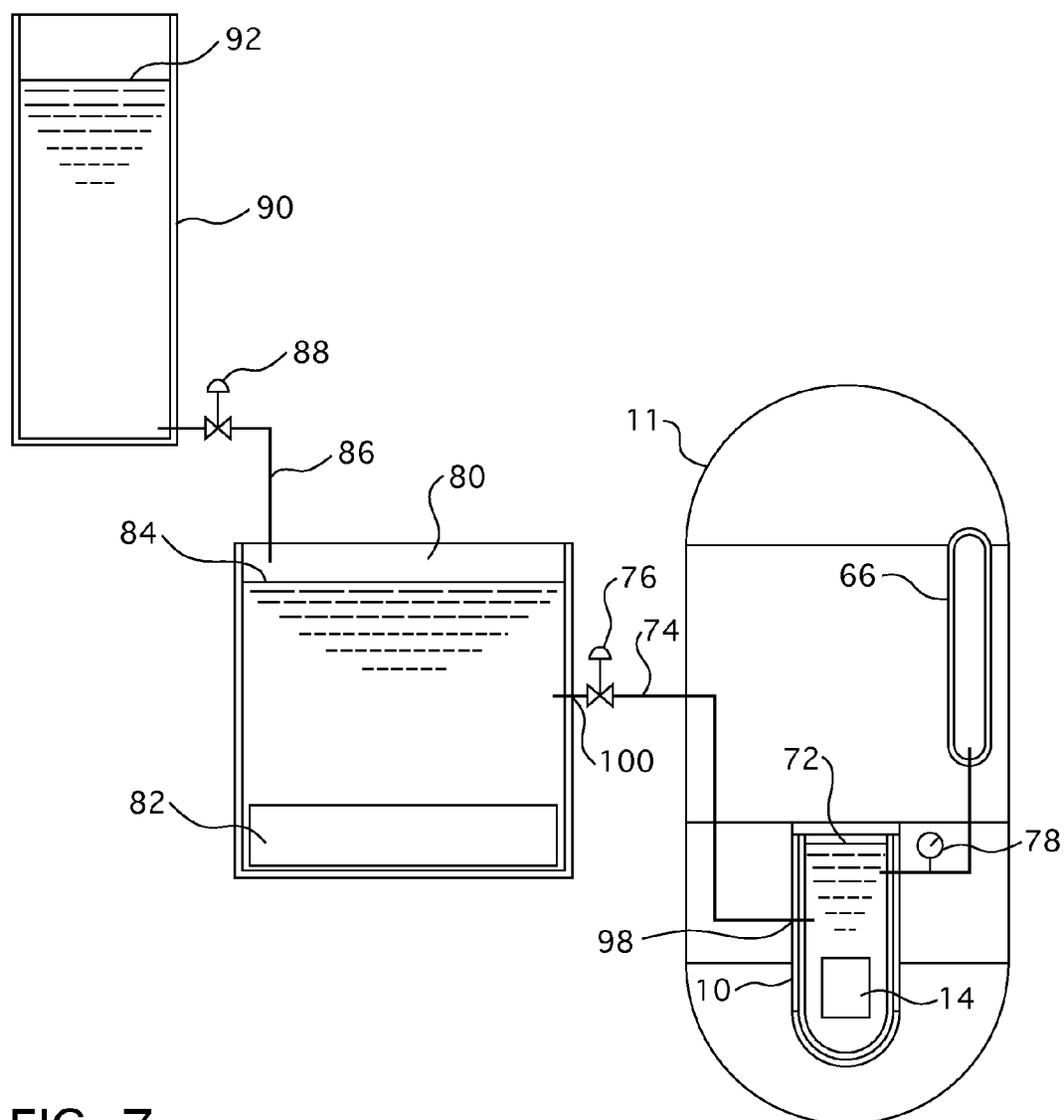
FIG. 7 is the schematic view of the nuclear power plant shown in FIG. 6 in which the reactor vessel closure head and upper internals are removed from the reactor assembly.
Figure 8:
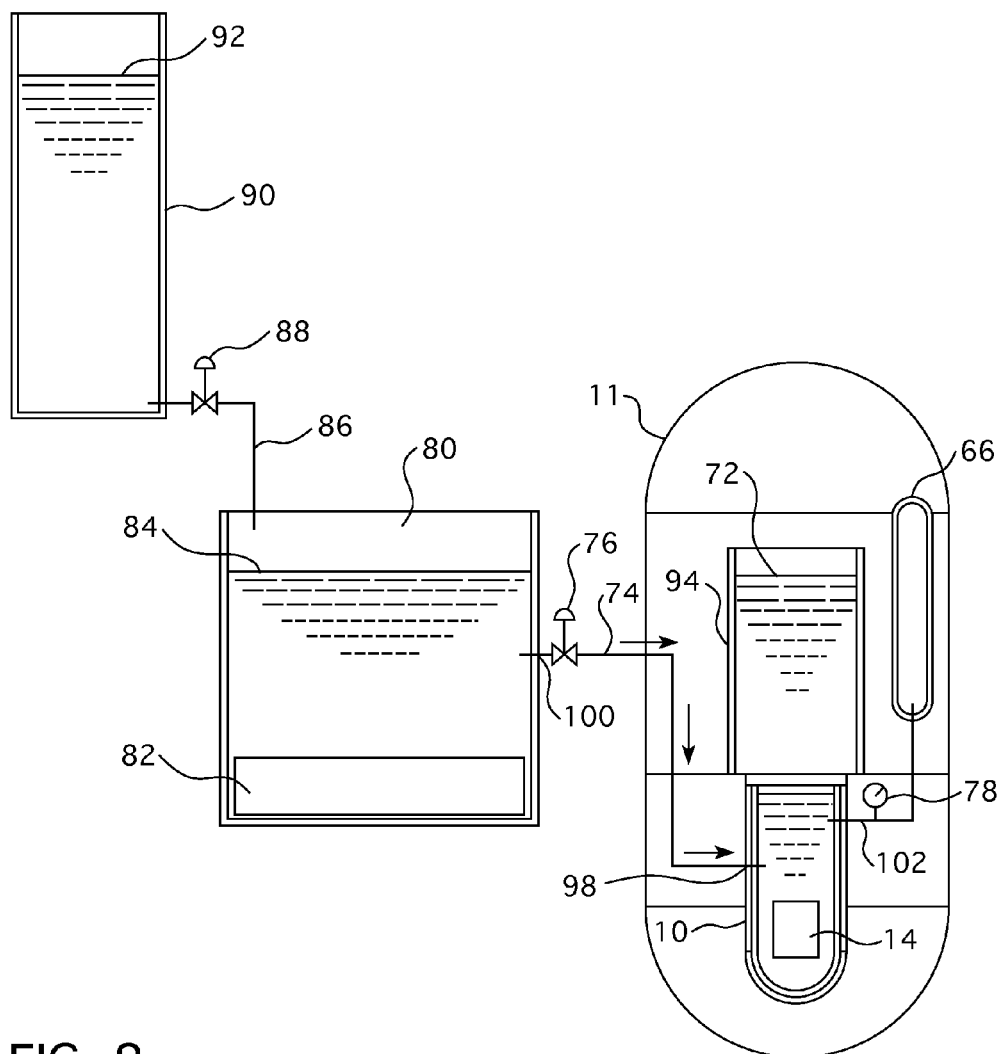
FIG. 8 is the schematic view of the nuclear power plant shown in FIG. 7 in which a refueling tank has been installed above the open reactor vessel and the water in the vessel raised to substantially fill the refueling tank.

In FIG. 7, the reactor vessel closure head 12 and upper internals are removed from the reactor vessel 10 so the fuel assemblies in the core 14 can be accessed. FIG. 8 shows the installation of a refueling tank 94. This tank can be integral to the refueling machine used to move the fuel, as disclosed in U.S. patent application Ser. No. 13/461,821, filed May 2, 2012, entitled "A Method of Refueling a Nuclear Reactor," or integral to the reactor containment building 11 design. The refueling tank 94 allows for the water to be drained, from the spent fuel pool 80 to the reactor vessel 14 through the reactor vessel penetration 98, until the level in the tank is at the same level as the spent fuel pool. At this point, the gauge 78 located on the branch line 102 is not needed to maintain the water level in the refueling tank 94.

Figure 9:
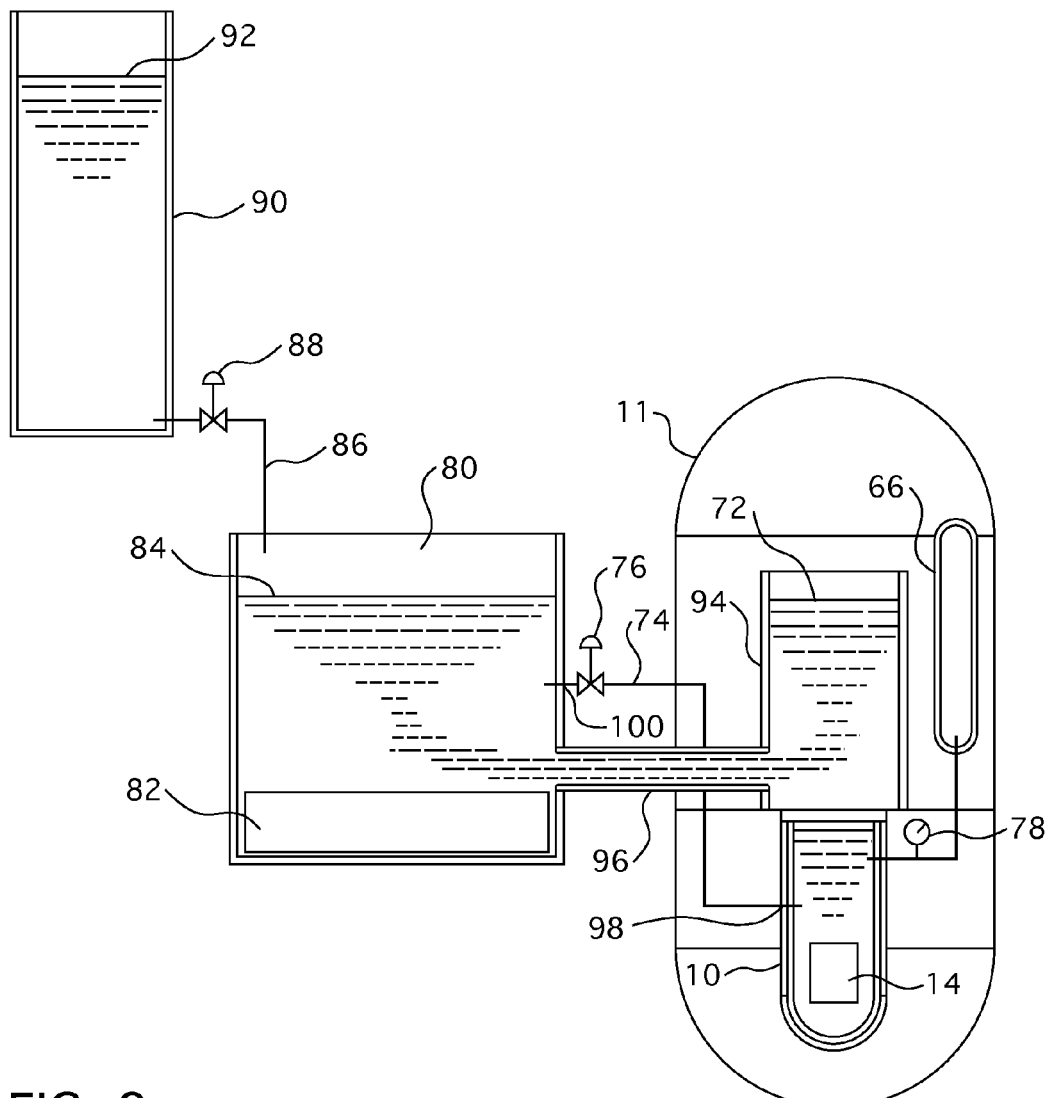
FIG. 9 is the schematic view of the nuclear power plant illustrated in FIG. 8 showing the installation (or opening) of a fuel transfer canal connecting the spent fuel pool with the refueling tank.

FIG. 9 shows the installation (or opening) of the fuel transfer canal 96. At this point, the pools 80 and 94 are connected and the levels 84 and 72 are maintained through the transfer canal connection 96 and normal refueling can begin. FIGS. 10-13 illustrate the response of this embodiment to a number of postulated accident conditions including one in which off-site power is lost during various stages of refueling.

Figure 10:
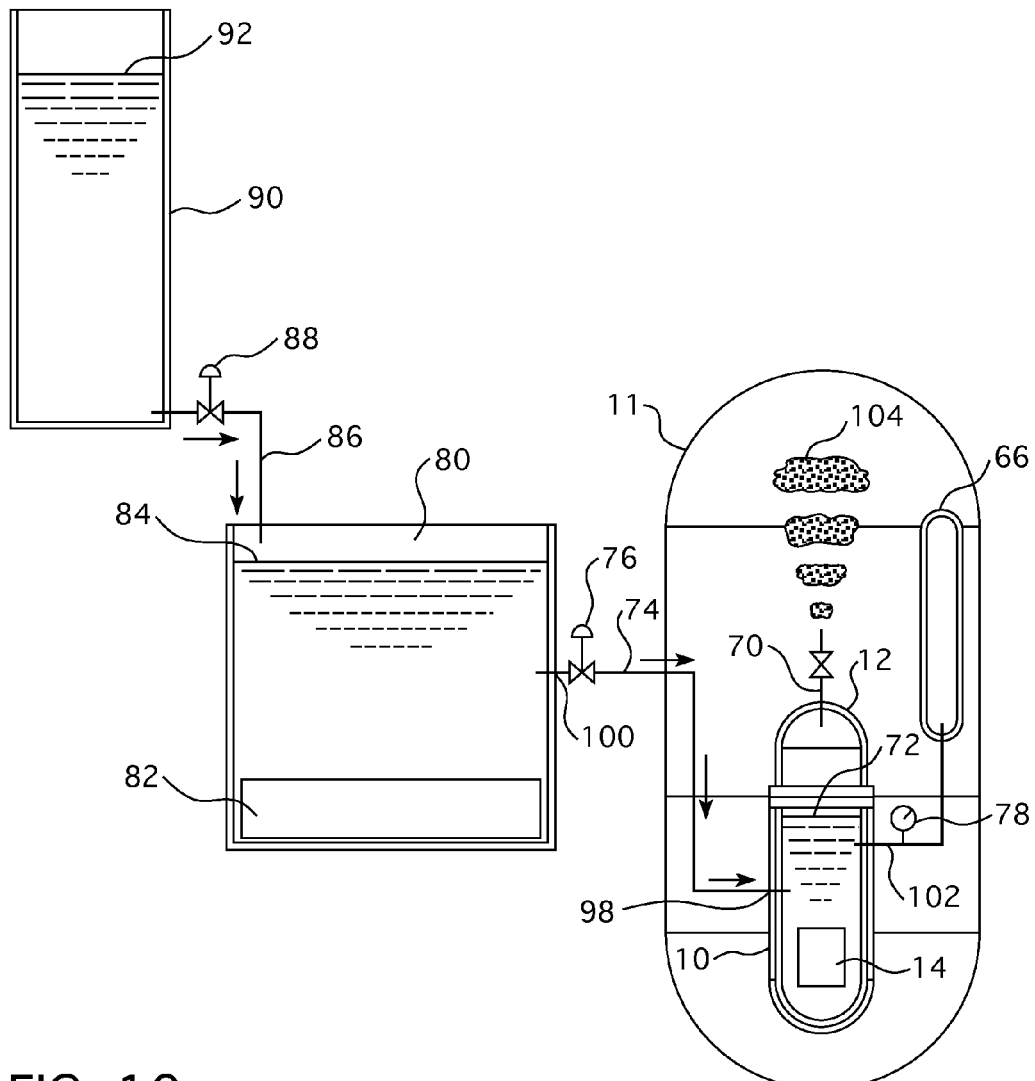
FIG. 10 is a schematic view of the nuclear plant illustrated in FIG. 5 showing the occurrence of an adverse operating event in which the coolant level in the reactor is being maintained by water from the spent fuel pool and the spent fuel pool level is being maintained by the ultimate heat sink tanks.
Figure 11:
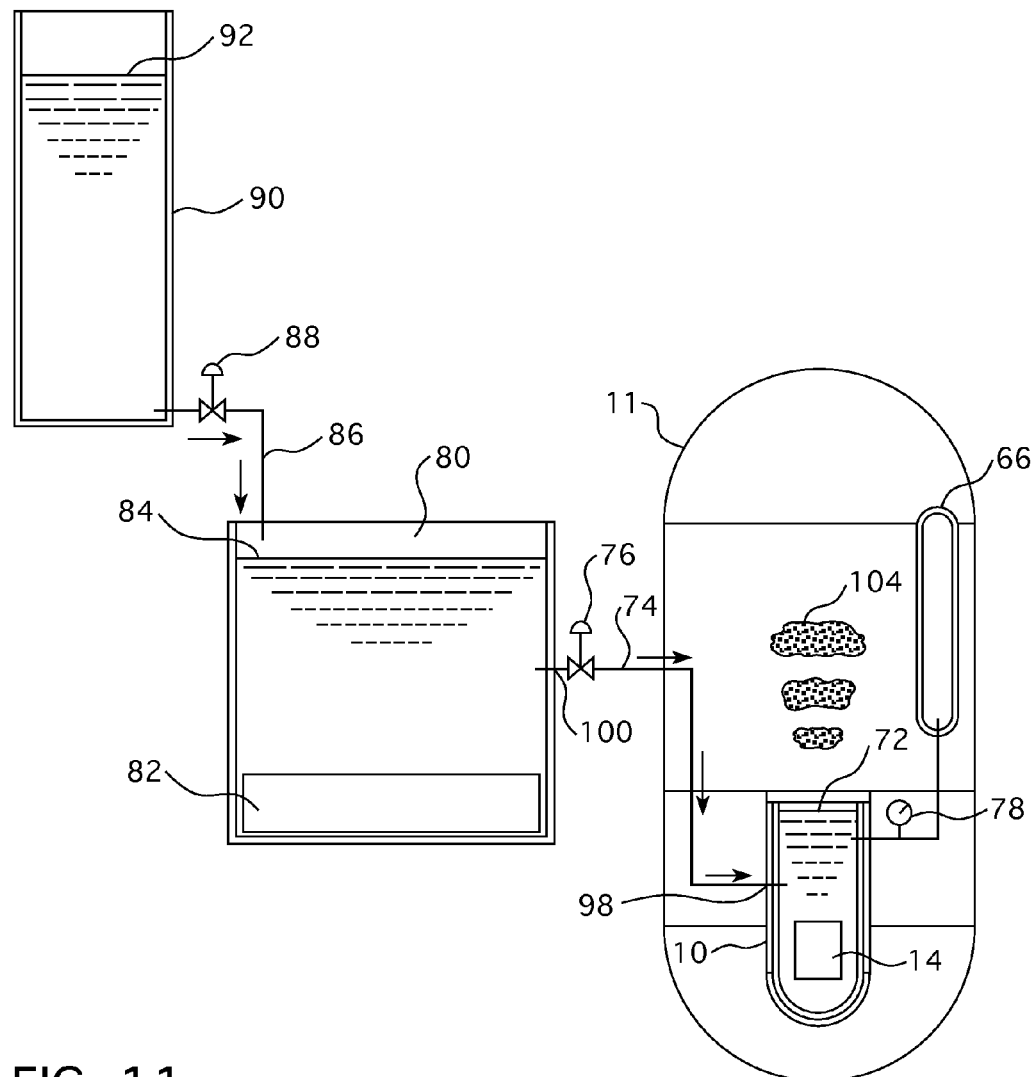
FIG. 11 is the schematic view of the nuclear power plant shown in FIG. 7 with the reactor head removed and the coolant level in the reactor vessel being maintained by the spent fuel pool and the spent fuel pool level being maintained passively during a loss of off-site power.

FIG. 10 shows an event wherein the coolant level 72 above the core 14 in the reactor vessel 10 is being maintained by water from the spent fuel pool 80 and the spent fuel pool level 84 is being maintained by the water in the ultimate heat sink tank 90 (though it should be appreciated that more than one tank 90 may be used). The pressure gauge 78 on the reactor branch line 102 controls the level of coolant 72 in the reactor vessel 10. At this stage of refueling, the level in the reactor coolant system has been reduced to a level at which the other passive safety systems 66 have been taken out of service. Vent 70 in the reactor coolant system allows the steam to exit the system into the containment 11. The steam will either condense on the containment vessel walls or be filtered and released to the atmosphere.

FIG. 11 again shows the reactor level 72 being maintained by the spent fuel pool 80 and the spent fuel pool level 84 being maintained passively during a loss of off-site power event by the ultimate heat sink 90 and passive valve 88 through the conduit 86. In this stage of refueling, the reactor vessel head 12 has been removed from the reactor vessel 10. The steam generated from the heated reactor coolant is vented through the flange of the open reactor vessel 10 and condenses on the containment vessel 11 or is released to the atmosphere after passing through filters that would contain radioactive contaminants.

Figure 12:
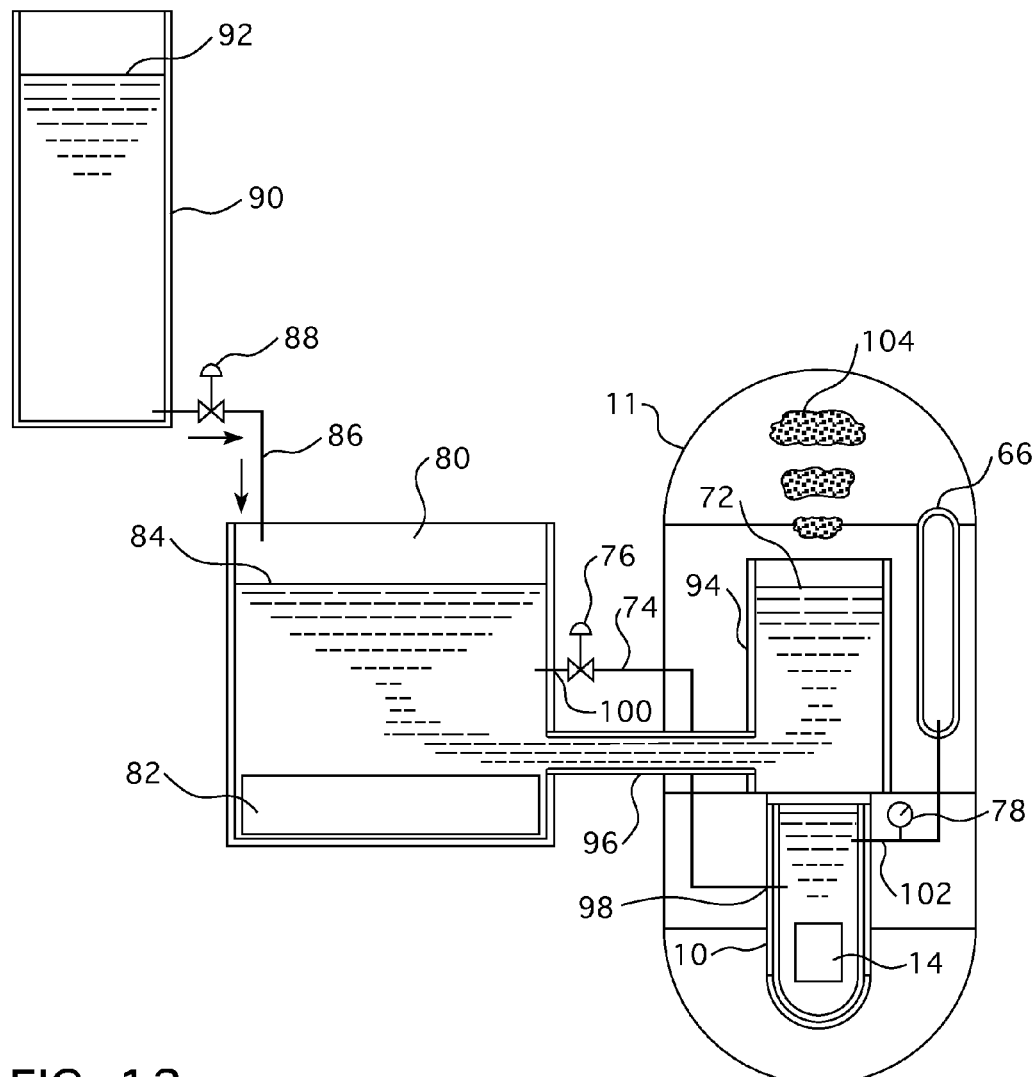
FIG. 12 is the schematic view of a nuclear power plant shown in FIG. 9 in which the refueling tank and canal have been installed and filled to match the coolant level of the spent fuel pool.

In FIG. 12, the refueling tank 94 and the refueling canal 96 have been filled to match the level 84 of the spent fuel pool 80 and the fuel transfer canal has been opened at the opening 62

(shown in FIG. 3) and flooded prior to a station blackout. At this point in the refueling process, the connection through the transfer canal 96 maintains water level above the reactor core 14. Under these circumstances, the pressure gauge 78 is no longer required to maintain this level. The ultimate heat sink 90 is still used to passively maintain the level 84 in the spent fuel pool 80. Since the spent fuel pool 80 is directly connected to the ultimate heat sink, the ultimate heat sink tank 90 maintains the water level above the core 14.

Figure 13:
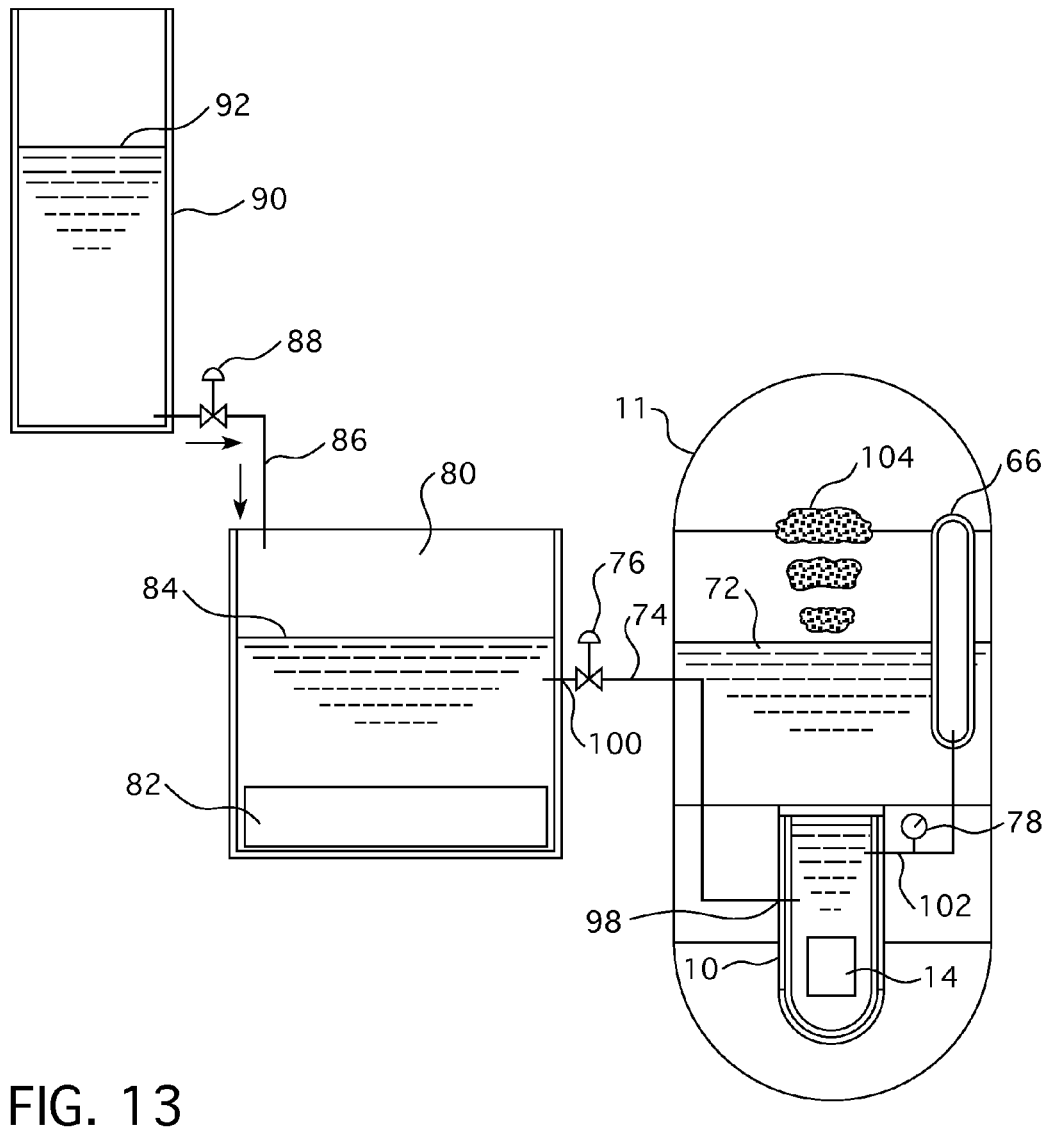
FIG. 13 is the schematic view of a nuclear power plant shown in FIG. 7 illustrating a condition resulting from a loss of off-site power and loss of DC backup power.

FIG. 13 illustrates a condition resulting from a loss of off-site power and loss of DC backup power which has occurred during the small window of the plant refueling outage in which the reactor has been disassembled but the refueling tank has not yet been installed. In this case, the valve 76 in the conduit 74, between the spent fuel pool 80 and the reactor penetration 98 fails in the safe position. With this valve open, the level 72 is not controlled and the spent fuel pool 80 continues to drain to the containment vessel 11 until the level 72 in the containment vessel matches the level 84 in the spent fuel pool. Again, steam 104, produced by boiling the water within and above the reactor vessel 10, will condense on the walls of the containment vessel 11 or be filtered before being released to the atmosphere. The ultimate heat sink tank 90 drains into the spent fuel pool to maintain the required level 84 in the spent fuel pool 80 and subsequently the containment vessel 11. This arrangement ensures that the reactor core 14 and the spent fuel 82 remain covered with water for the period required by the design. This time period is controlled solely by the amount of water available in the ultimate heat sink tank 90, thus providing truly passive safety during refueling.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of passively, safely maintaining a coolant level of a nuclear power generating facility, above a nuclear core at a preprogrammed level for an extended period of time during a facility outage in which a reactor vessel housing the nuclear core is substantially depressurized, the power generating facility comprising:
    a containment building that houses the reactor vessel which has an elongated axial dimension that surrounds the nuclear core in which fission reactions take place, and an open end of the reactor vessel is axially spaced from the nuclear core, with the open end sealed by a head at a reactor vessel flange;
    a spent fuel pool supported outside the containment building at an elevation that extends substantially above the reactor vessel, the spent fuel pool being in fluid communication with an interior of the reactor vessel through a first valve that is configured to automatically supply coolant from the spent fuel pool to the interior of the reactor vessel when a sensed level of coolant within the reactor vessel is below a given level; and
    an ultimate heat sink coolant reservoir whose upper level of a coolant under normal operation of the nuclear power generating facility is supported at an elevation substantially above the spent fuel pool, with a lower portion of the ultimate heat sink coolant reservoir in fluid communication with the spent fuel pool through a second valve whose operation is automatically controlled by a level of coolant in the spent fuel pool to maintain the coolant in the spent fuel pool at approximately a preselected level;
the method including the steps of:
    sensing coolant level within the reactor vessel above the nuclear core from a gauge on a branch coolant line connected to the reactor vessel, having an output indicative of a coolant level above the nuclear core;
    automatically controlling the first valve to drain coolant from the spent fuel pool into the reactor vessel when the sensing step identifies the coolant level is at the given level to maintain the coolant level within the reactor vessel at the preprogrammed level above the nuclear core; and
    automatically controlling the second valve to drain coolant from the ultimate heat sink coolant reservoir into the spent fuel pool to maintain the coolant in the spent fuel pool at approximately the preselected level.

2. The method of claim 1 in which the nuclear power generating facility has a station blackout including the steps of:
    opening the first and second valves; and
    flooding the reactor vessel.

3. The method of claim 1 wherein the preprogrammed level is approximately at the reactor vessel flange.

4. The method of claim 1 wherein the nuclear power generating facility includes a refueling cavity supported above the reactor vessel flange and the reactor vessel head has been removed, the gauge controls the level of coolant above the nuclear core within the refueling cavity.

5. The method of claim 4 wherein the nuclear power generating facility includes a refueling canal establishing a fluid communication path between an inside of the refueling cavity at an elevation above the reactor vessel flange, and the spent fuel pool, through which a fuel assembly can pass, and means for isolating the fluid communication path from the inside of the refueling cavity, including the steps of:
    opening the means for isolating the fluid communication path; and
    controlling a level of the coolant within the refueling cavity through the fluid communication path.

6. The method of claim 5 in which the nuclear power generating facility has a station blackout including the steps of:
    opening the first valve; and
    flooding the containment building.

* * * * *